(12) United States Patent
Jo

(10) Patent No.: US 8,766,507 B2
(45) Date of Patent: Jul. 1, 2014

(54) MOTOR PULLEY

(75) Inventor: Hee Kwon Jo, Wonju-si (KR)

(73) Assignee: Mando Corporation, Gyeonggi-Do (KR)

( * ) Notice: Subject to any disclaimer, the term of this patent is extended or adjusted under 35 U.S.C. 154(b) by 481 days.

(21) Appl. No.: 13/022,196

(22) Filed: Feb. 7, 2011

(65) Prior Publication Data

US 2011/0193431 A1 Aug. 11, 2011

(30) Foreign Application Priority Data

Feb. 10, 2010 (KR) .................. 10-2010-0012203
Jan. 21, 2011 (KR) .................. 10-2011-0006365

(51) Int. Cl.
H02K 1/06 (2006.01)
H02K 5/24 (2006.01)
F16H 55/30 (2006.01)

(52) U.S. Cl.
USPC ................ 310/216.074; 310/51; 474/152

(58) Field of Classification Search
USPC ............... 310/216.074, 51; 474/152
See application file for complete search history.

(56) References Cited

U.S. PATENT DOCUMENTS

| | | | | |
|---|---|---|---|---|
| 3,738,187 A * | 6/1973 | Hisserich | ...................... | 474/148 |
| 4,678,971 A * | 7/1987 | Kanazawa et al. | ............ | 318/135 |
| 4,846,309 A * | 7/1989 | Nara et al. | ..................... | 254/342 |
| 4,915,675 A * | 4/1990 | Avramidis | ..................... | 474/213 |
| 5,163,826 A * | 11/1992 | Cozens | .......................... | 418/170 |
| 5,360,325 A * | 11/1994 | Henry et al. | ................... | 418/126 |
| 6,305,780 B1 * | 10/2001 | Askren et al. | .................... | 347/37 |
| 6,481,991 B2 * | 11/2002 | Takagi et al. | ................. | 418/109 |
| 6,672,983 B2 * | 1/2004 | Mohr et al. | ..................... | 474/152 |
| 7,012,351 B2 * | 3/2006 | Kashihara et al. | ..... | 310/216.112 |
| 7,042,120 B2 * | 5/2006 | Lim et al. | ......................... | 310/51 |
| 7,119,507 B2 * | 10/2006 | Nishijima | ................ | 318/400.41 |
| 8,435,145 B2 * | 5/2013 | Botez | ........................... | 474/156 |
| 2001/0026767 A1 * | 10/2001 | Takagi et al. | ................. | 418/109 |
| 2002/0169044 A1 * | 11/2002 | Young | ............................ | 474/152 |
| 2002/0182990 A1 * | 12/2002 | Thyssen | ........................ | 451/242 |
| 2003/0026722 A1 * | 2/2003 | Takagi et al. | ................. | 418/171 |
| 2004/0185977 A1 * | 9/2004 | Young et al. | ................... | 474/202 |
| 2006/0033396 A1 * | 2/2006 | Kashihara et al. | ............ | 310/216 |
| 2006/0086421 A1 * | 4/2006 | Gruender | ...................... | 144/178 |
| 2006/0119299 A1 * | 6/2006 | Nishijima | ..................... | 318/254 |
| 2006/0154766 A1 * | 7/2006 | Lacy et al. | ..................... | 474/148 |
| 2006/0252592 A1 * | 11/2006 | Young | ............................ | 474/161 |
| 2006/0263114 A1 * | 11/2006 | Ogawa | ........................... | 399/167 |
| 2006/0290225 A1 * | 12/2006 | Mipo et al. | ..................... | 310/187 |
| 2007/0067992 A1 * | 3/2007 | Uenishi et al. | ............... | 29/893.2 |
| 2008/0023257 A1 * | 1/2008 | Budaker et al. | ............... | 180/444 |
| 2009/0064486 A1 * | 3/2009 | Toide et al. | ..................... | 29/596 |
| 2009/0209380 A1 * | 8/2009 | Hirai et al. | ..................... | 474/156 |
| 2009/0247337 A1 * | 10/2009 | Sakura et al. | ................. | 474/156 |

(Continued)

FOREIGN PATENT DOCUMENTS

JP 2009056687 A * 3/2009

OTHER PUBLICATIONS

Translation of foreign document JP 2009056687 A (Year 2009).*

Primary Examiner — Tran Nguyen
Assistant Examiner — Alex W Mok
(74) Attorney, Agent, or Firm — McDermott Will & Emery LLP

(57) ABSTRACT

A motor pulley minimizes an influence of a resonance phenomenon, thereby reducing noise and vibrations and preventing lowering of durability.

5 Claims, 4 Drawing Sheets

| STEERING SPEED | MOTOR SPEED | MOTOR COMMUTATIONS (Hz) | | | MOTOR PULLEY | NOISE RESONANCE FREQUENCIES (Hz) |
|---|---|---|---|---|---|---|
| rpm | rpm | 6-TH RIPPLE | 9-TH RIPPLE | 18-TH RIPPLE | 41 RIDGES | 6-TH & 41 RIDGES |
| 60 | 987 | 99 | 148 | 296 | 674 | 4047 |

(a)

| STEERING SPEED | MOTOR SPEED | MOTOR COMMUTATIONS (Hz) | | | MOTOR PULLEY | NOISE RESONANCE FREQUENCIES (Hz) |
|---|---|---|---|---|---|---|
| rpm | rpm | 6-TH RIPPLE | 9-TH RIPPLE | 18-TH RIPPLE | 43 RIDGES | 6-TH & 43 RIDGES |
| 60 | 1197 | 120 | 180 | 359 | 858 | 5146 |

(b)

(56) References Cited

U.S. PATENT DOCUMENTS

2009/0286639 A1* 11/2009 Sakura et al. ............ 474/152
2009/0286640 A1* 11/2009 Sakura et al. ............ 474/153
2010/0021321 A1* 1/2010 Koike et al. ............ 417/410.3
2010/0026128 A1* 2/2010 Ionel ...................... 310/156.53
2010/0173739 A1* 7/2010 Sakura .................... 474/226

* cited by examiner

FIG. 3

| CLASSIFICATION | RELEVANT FACTORS |
|---|---|
| 6-TH MOTOR NOISE FREQUENCY | THE NUMBER OF MOTOR POLES |
| 9-TH MOTOR NOISE FREQUENCY | THE NUMBER OF MOTOR SLOTS |
| 18-TH MOTOR NOISE FREQUENCY | THE LEAST COMMON MULTIPLE OF THE NUMBER OF MOTOR POLES AND THE NUMBER OF MOTOR SLOTS |

(a)

| CLASSIFICATION | RELEVANT FACTOR |
|---|---|
| MOTOR PULLEY NOISE FREQUENCY | THE NUMBER OF TEETH OF MOTOR PULLEY |

| STEERING SPEED | MOTOR SPEED | MOTOR COMMUTATIONS (Hz) | | | MOTOR PULLEY | NOISE RESONANCE FREQUENCIES (Hz) |
|---|---|---|---|---|---|---|
| | | 6-TH RIPPLE | 9-TH RIPPLE | 18-TH RIPPLE | 41 RIDGES | 6-TH & 41 RIDGES |
| rpm | rpm | | | | | |
| 60 | 987 | 99 | 148 | 296 | 674 | 4047 |

(b)

| STEERING SPEED | MOTOR SPEED | MOTOR COMMUTATIONS (Hz) | | | MOTOR PULLEY | NOISE RESONANCE FREQUENCIES (Hz) |
|---|---|---|---|---|---|---|
| | | 6-TH RIPPLE | 9-TH RIPPLE | 18-TH RIPPLE | 43 RIDGES | 6-TH & 43 RIDGES |
| rpm | rpm | | | | | |
| 60 | 1197 | 120 | 180 | 359 | 858 | 5146 |

MOTOR PULLEY

CROSS-REFERENCE TO RELATED APPLICATION

This application claims priorities from and the benefit under 35 U.S.C. §119(a) of Korean Patent Application No. 10-2010-0012203 filed on Feb. 10, 2010 and Korean Patent Application No. 10-2011-0006365 filed on Jan. 21, 2011, which are hereby incorporated by reference for all purposes as if fully set forth herein.

BACKGROUND OF THE INVENTION

1. Field of the Invention

The present invention relates to a motor pulley. More particularly, the present invention relates to a motor pulley that minimizes an influence of a resonance phenomenon, thereby reducing noise and vibrations and preventing the lowering of durability.

2. Description of the Prior Art

Since the number of teeth of a motor pulley is conventionally selected, considering only an output of a steering system, a motor pulley noise frequency generated when teeth of the motor pulley are enmeshed with teeth of a belt may become an integer number of times as high as a motor noise frequency generated by the motor itself, increasing the possibility of generating a resonance phenomenon. Accordingly, noise and vibrations become severe and durability is lowered.

SUMMARY OF THE INVENTION

Accordingly, the present invention has been made to solve the above-mentioned problems occurring in the prior art, and an object of the present invention is to provide a method of selecting the number of teeth of a motor pulley that can minimize an influence on a resonance phenomenon, reduce noise and vibrations, and prevent lowering of durability, and a motor pulley having a predetermined number of teeth selected according to the selection method.

In accordance with one aspect of the present invention, there is provided a motor pulley connected to a motor having motor poles and motor slots, wherein the number of the teeth of the motor pulley is selected such that a noise resonance frequency generated when a motor noise frequency generated by at least one of the number of the motor poles and the number of the motor slots becomes an integer number of times as high as a motor pulley noise frequency generated when the teeth of the motor pulley are enmeshed with the teeth of the belt enters a frequency region higher than a predefined critical frequency, and wherein the number of the teeth of the motor pulley is relatively prime with respect to the order of the motor noise frequency.

In accordance with another aspect of the present invention, there is provided a motor pulley connected to a motor, wherein the number of the teeth of the motor pulley is relatively prime with respect to the number of motor poles of the motor, the number of motor slots of the motor, and the least common multiple of the number of the motor poles and the number of the motor slots.

In accordance with still another aspect of the present invention, there is provided a motor pulley connected to a motor, wherein the number of the teeth of the motor pulley is a prime number.

In accordance with yet another aspect of the present invention, there is provided a motor pulley connected to a motor having motor poles and motor slots, wherein the number of the teeth of the motor pulley is selected such that a noise resonance frequency generated when a motor noise frequency generated by at least one of the number of the motor poles and the number of the motor slots coincides with a motor pulley noise frequency generated when the teeth of the motor pulley are enmeshed with the teeth of the belt enters a frequency region higher than a predefined critical frequency, and wherein the number of the teeth of the motor pulley is relatively prime with respect to the order of the motor noise frequency.

As mentioned above, the present invention provides a motor pulley in which the number of teeth is determined such that an influence of a resonance phenomenon can be minimized, noise and vibrations can be reduced, and the lowering of durability can be prevented.

BRIEF DESCRIPTION OF THE DRAWINGS

The above and other objects, features and advantages of the present invention will be more apparent from the following detailed description taken in conjunction with the accompanying drawings, in which:

FIG. 3 illustrates tables representing relevant factors of motor noise frequencies and motor pulley noise frequencies respectively; and FIG. 4 illustrates tables representing the number of teeth of two exemplary motor pulleys whose noise resonance frequencies are determined to be moved to high regions and their noise resonance frequencies.

DETAILED DESCRIPTION OF THE PREFERRED EMBODIMENTS

Figure 1:
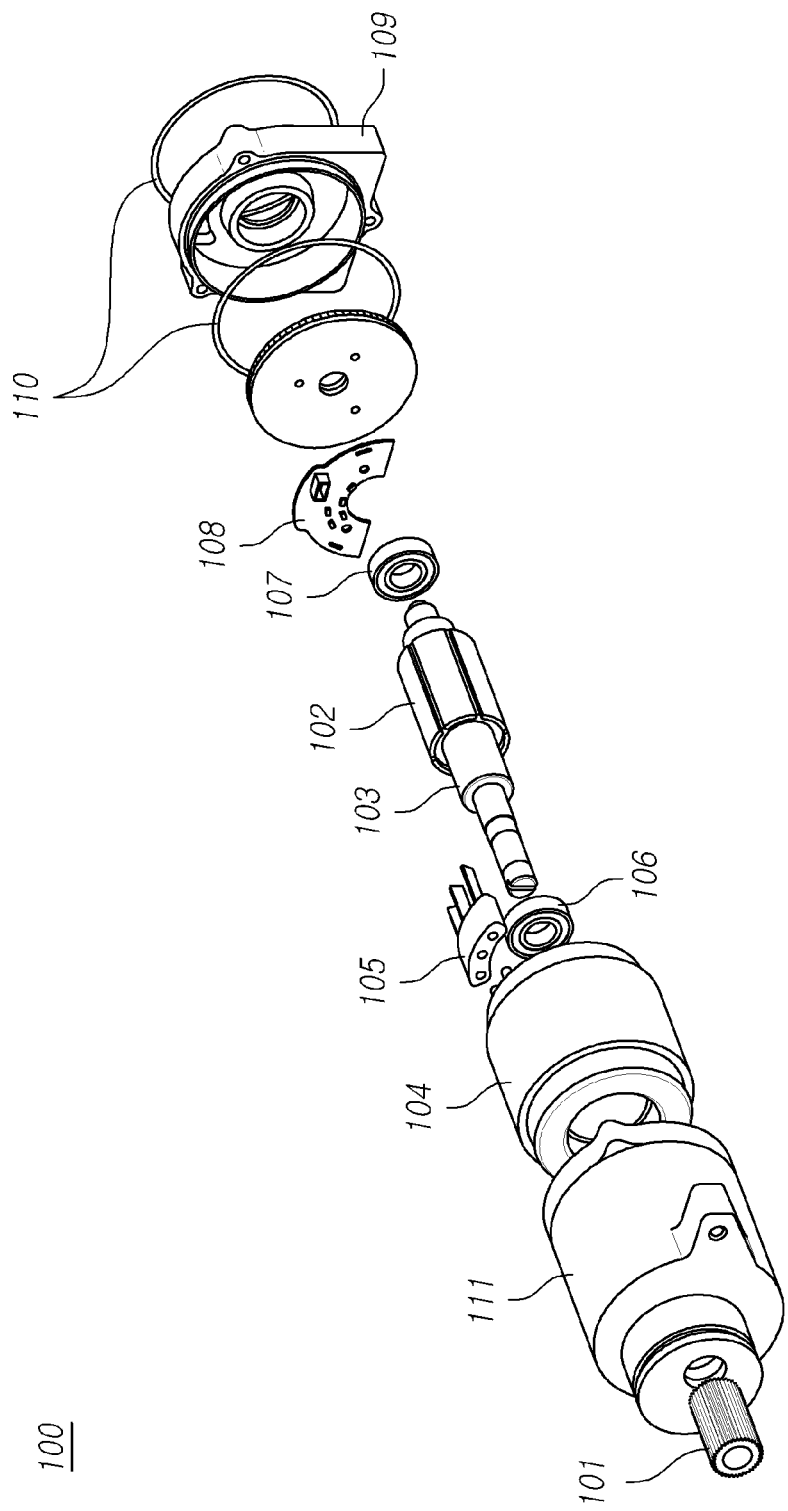
FIG. 1 is an exploded perspective view illustrating a motor apparatus.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a configuration diagram illustrating part of a motor apparatus 100 provided in a steering system.

Referring to FIG. 1, the motor apparatus 100 generally includes such parts as a motor pulley 101, a rotor core/magnet 102, a rotor shaft 103, a rotor core 104, a motor power terminal 105, a bearing 106 on a side of a motor pulley 101, an electronic control unit (ECU) 107, a sensing magnet assembly 108, a bracket 109, an O-ring 110, and a housing 111. The remaining parts of the motor apparatus 100 except for the motor pulley 101 may generically constitute a motor.

The configuration of the motor apparatus 100 as shown in FIG. 1 is simply an example and may be modified according to a function of the motor apparatus 100 and a steering system to which the motor apparatus 100 is mounted.

Figure 2:
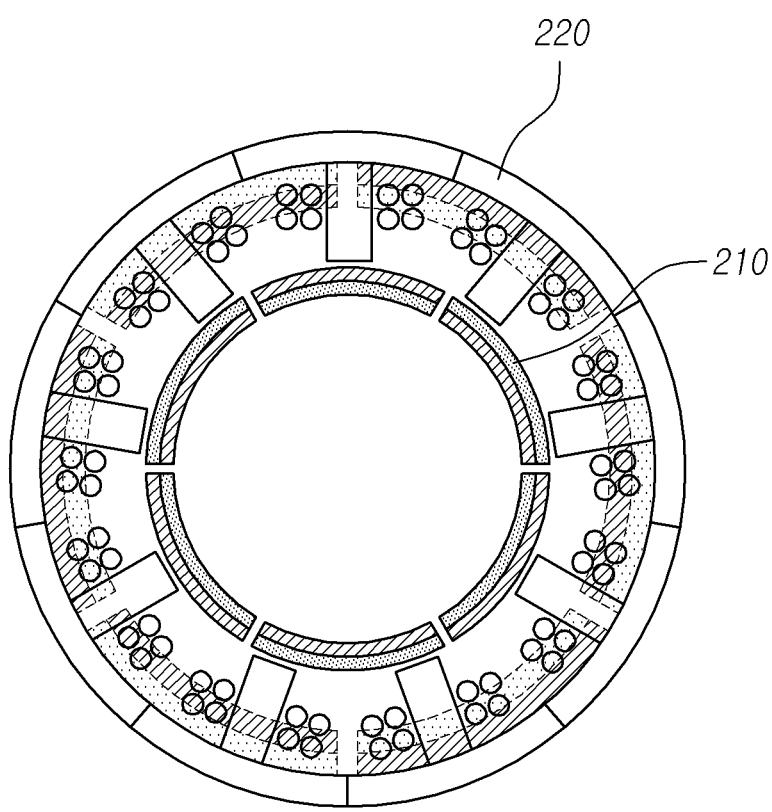
FIG. 2 is an exemplary view illustrating the number of poles and the number of slots of a motor.

AS shown in FIG. 2 in which six motor poles and nine motor slots are exemplified, the motor pulley 101 is connected to a motor including motor poles 210 that may serve as a rotor and motor slots 220 that may serve as a stator so as to be rotated, and a belt enmeshed with the motor pulley 101 is rotated while the motor pulley 101 is being rotated.

If a motor pulley noise frequency generated when the teeth of the motor pulley 101 is enmeshed with the teeth of the belt coincides with a motor noise frequency generated by the motor, a resonance phenomenon may be generated, causing noise and vibrations of the system to become severe and lowering durability. The present invention discloses a method of selecting the number of teeth of a motor pulley (i.e. the number of ridges of the motor pulley 101) in order to reduce the possibility of generating a resonance phenomenon, thereby reducing noise and vibrations of a system and enhancing durability.

In a method of selecting the teeth of the motor pulley 101 according to an embodiment of the present invention, the number of the teeth of the motor pulley 101 is selected by moving a noise resonance frequency due to a resonance phenomenon when a motor noise frequency generated by at least one of the number of the motor poles 210 and the number of the motor slots 220 becomes an integer number of times as high as a motor pulley noise frequency generated when the teeth of the motor pulley 101 are enmeshed with the teeth of the belt to a frequency region higher than a predefined critical frequency to minimize an influence of resonance.

The number of the teeth of the motor pulley 101 selected in this way is a relative prime number with respect to the orders of the motor noise frequency. Here, two integers are said to be relatively prime if they have no common positive factor other than 1. For example, 7 is a relative prime with respect to 13.

For example, the number of motor poles may be 6 or 8 and the number of motor slots may be 9 or 12, in which case when the number of motor poles is 6 and the number of motor slots is 9, the number of teeth of a pulley should be a relative prime number with respect to the orders of the motor noise frequency, i.e. 6, 9, and 18. When the number of motor poles is 8 and the number of motor slots is 12, the number of teeth of a pulley should be a relative prime number with respect to the orders of the motor noise frequency, i.e. 8, 12, and 24.

The number of the teeth of the motor pulley that can be calculated in this way may be, for example, one of 31, 37, 41, 43, 47, 53, and 59.

Referring to FIG. 3, the relevant factors for generating the above-described motor noise frequency includes the number of the motor poles of the motor and the number of the motor slots of the motor, and the least common multiple of the number of the motor poles and the motor slots may be a relevant factor that influences the order of the motor noise frequency. Also, the relevant factor for generating the above-described motor pulley noise frequency includes the number of the teeth of the motor pulley 101.

That is, the order of the motor noise frequency may be at least one of the number of the motor poles, the number of the motor slots, and the least common multiple of the number of the motor poles and the number of the motor slots. In other words, the motor noise frequency may includes at least one of the motor noise frequency generated by the number of the motor poles, the motor noise frequency generated by the number of the motor slots, and the motor noise frequency generated by the least common multiple of the number of the motor poles and the number of the motor slots.

For example, Referring to FIG. 3A, when the number of the motor poles is 6 and the number of the motor slots is 9, the order of the motor noise frequency may be at least one of 6, 9, and 18 (18 is the least common multiple of 6 and 9). In other words, the motor noise frequency in the case of the number of the motor poles being 6 and the number of the motor slots being 9 may include at least one of a sixth motor noise frequency (the motor noise frequency generated by six motor poles), a ninth motor noise frequency (the motor noise frequency generated by nine motor slots), and a 18-th motor noise frequency (the motor noise frequency generated by the least common multiple of 6 and 9).

According to the example, the number of the teeth of the motor pulley 101 is relatively prime with respect to the orders of the motor noise frequency, i.e. 6, 9, and 18, and the number of the teeth of the motor pulley 101 may be one of 31, 37, 41, 43, 47, 53, 59, etc.

FIG. 4 is a view illustrating the numbers of teeth (41 and 43) of two exemplary motor pulleys 101 determined so as to be relatively prime with respect to the order of the motor noise frequency to move the noise resonance frequency to a high frequency region (ex: 4000 Hz or higher), that is, to minimize an influence of a resonance phenomenon, and the noise resonance frequencies. The order of the motor noise frequency may also mean the order of a ripple (noise) of a motor commutation.

Referring to FIG. 4A, it can be confirmed that the noise resonance frequency calculated with respect to the motor pulley noise frequency (674 Hz) generated by the motor pulley 101 having a sixth motor noise frequency 99 Hz and the number of teeth of the motor pulleys of 41 is 4047 Hz.

In the following, it will be described that a noise resonance frequency is 4047 Hz with respect to the sixth motor noise frequency 99 Hz and the motor pulley noise frequency 674 Hz generated by the motor pulley 101 having the number of motor pulleys of 41 by selecting the number of teeth of the motor pulley 101 to be 41 with reference to FIG. 4A, Equation 1, and Equation 2.

$$\text{Motor rotation frequency [Hz]} = \text{Motor speed [RPM]}/60 \text{ [sec/min]} \quad \text{Equation 1}$$

$$\text{Noise resonance frequency} = (\text{the least common multiple of the order of the motor noise frequency and the number of teeth of the motor pulley}) * \text{Motor rotation frequency} \quad \text{Equation 2}$$

If a motor rotation frequency is calculated using Equation 1, i.e. a motor rotation frequency equation, a motor rotation frequency of 16.45 [Hz] can be obtained by dividing a motor speed [RPM] by 60 [sec/min].

If a noise resonance frequency at a sixth motor noise frequency is calculated using the obtained motor rotation frequency and Equation 2, i.e. a noise resonance frequency equation, a noise resonance frequency of approximately 4047 [Hz] can be calculated by multiplying the least common multiple of the order of the motor noise frequency of 6 and the number of the teeth of the motor pulley of 41 by the calculated motor rotation frequency of 16.45 [Hz]. Here, since the order of the motor noise frequency of 6 is relatively prime with respect to the number of the teeth of the motor pulley of 41, the least common multiple of the order of the motor noise frequency and the number of the teeth of the motor pulley becomes larger, whereby the noise resonance frequency enters a higher region, reducing an influence of the resonance phenomenon.

In the same way, a noise resonance frequency with respect to a ninth motor noise frequency and a motor pulley noise frequency of the motor pulley 101 having 41 teeth and a noise resonance frequency with respect to a 18-th motor noise frequency and a motor pulley noise frequency of the motor pulley 101 having 41 teeth.

Referring to FIG. 4B, it can be confirmed that a noise resonance frequency with respect to the sixth motor noise frequency 120 Hz and a motor pulley noise frequency 8584 Hz generated by the motor pulley 101 having 43 teeth is 5146 Hz.

In the following, it will be described with reference to FIG. 4B, Equation 1, and Equation 2 that a noise resonance frequency with respect to a sixth motor noise frequency 120 Hz and a motor pulley noise frequency 858 Hz generated by the motor pulley having 43 teeth becomes 5146 Hz by selecting the number of the teeth of the motor pulley 101 to be 43.

If a motor rotation frequency is calculated using Equation 1, i.e. a motor rotation frequency equation, a motor rotation frequency of 19.95 [Hz] can be obtained by dividing a motor speed of 1197 [RPM] by 60 [sec/min].

If a noise resonance frequency at a sixth motor noise frequency is calculated using the calculated motor rotation frequency and Equation 2, i.e. noise resonance frequency equation, a noise resonance frequency of approximately 5146 [Hz] can be obtained by multiplying the least common multiple, i.e. 258 of the order of a motor noise frequency of 6 and the number of the teeth of the motor pulley of 43 by the calculated motor rotation frequency 19.95 [Hz]. Here, since the order of the motor noise frequency, i.e. 6 is relatively prime with respect to the number of the teeth of the motor pulley, i.e. 43, the least common multiple of the order of the motor noise frequency and the number of the teeth of the pulley becomes larger, whereby the noise resonance frequency enters a high region, reducing an influence on a resonance phenomenon.

In the same way, a noise resonance frequency with respect to a ninth motor noise frequency and a motor pulley noise frequency of the motor pulley 101 having 43 teeth and a noise resonance frequency with respect to a 18-th motor noise frequency and a motor pulley noise frequency of the motor pulley 101 having 43 teeth.

Meanwhile, it will be described for reference that sixth/ninth/18-th motor noise frequencies (sixth/ninth/18-th ripple noise frequencies) and a motor pulley noise frequency can be obtained to be the values represented in FIGS. 4A and 4B.

In relation to a motor noise frequency, the sixth motor noise frequency (the noise frequency generated by the number of the motor poles) can be obtained by multiplying the number of the motor poles by the motor rotation frequency (Equation 1). The ninth motor noise frequency (the noise frequency generated by the number of the motor slots) can be obtained by multiplying the number of the motor slots by the motor rotation frequency (Equation 1). The 18-th motor noise frequency (the noise frequency generated by the least common multiple of the number of the motor poles and the number of the motor slots) can be obtained by multiplying the least common multiple of the number of the motor poles and the number of the motor slots by the motor rotation frequency (Equation 1).

In relation to the motor pulley noise frequency, the motor pulley noise frequency is a noise frequency generated when the teeth of the belt are enmeshed with the teeth of the motor pulley 101, and can be obtained by multiplying the number of the teeth of the motor pulley by the motor rotation frequency (=a motor speed [rpm]/[sec/min]).

The motor noise frequency and the motor pulley noise frequency can be expressed as in Equation 3.

Sixth motor noise frequency=the number of motor poles*a motor rotation frequency Ninth motor noise frequency=the number of motor slots*a motor rotation frequency 18-th motor noise frequency=(the least common multiple of the number of motor poles and the number of motor slots)*a motor rotation frequency Motor pulley noise frequency=the number of teeth of the motor pulley*a motor rotation frequency    Equation 3

It can be confirmed that if a sixth motor noise frequency (sixth ripple noise frequency), a ninth motor noise frequency (sixth ripple noise frequency), and a 18-th motor noise frequency (sixth ripple noise frequency) are calculated in FIG. 4A where a motor speed is 987 RPM to calculate the motor noise frequency using Equation 3, they are 99 Hz (=6*16.45), 148 Hz (=9*16.45), and 296 Hz (=18*16.45) respectively. Also, it can be confirmed that if a sixth motor noise frequency (sixth ripple noise frequency), a ninth motor noise frequency (sixth ripple noise frequency), and a 18-th motor noise frequency (sixth ripple noise frequency) are calculated in FIG. 4B where a motor speed is 1197 RPM, they are 120 Hz (=6*19.95), 180 Hz (=9*19.95), and 359 Hz (=18*19.95) respectively.

It can be seen that the motor pulley noise frequency calculated using Equation 3 is 674 Hz (=41*16.45) in FIG. 4A where the number of the teeth of the motor pulley is 41 is 674 Hz (=41*16.45). It can be also seen that the motor pulley noise frequency in FIG. 4A where the number of the teeth of the motor pulley is 43 is 858 Hz (=43*19.95).

If the motor pulley noise frequency is an integer number of times as high as the sixth/ninth/18-th motor noise frequencies, a resonance phenomenon is greatly generated such that noise and vibrations can become severe, which can cause a big problem to the system. However, according to the present invention, it can be seen that since the number of teeth of the motor pulley is selected such that it is relatively prime with respect to the orders (the number of motor poles, the number of motor slots, and the least common multiple of the number of motor poles and the number of motor slots), so that a resonance phenomenon cannot greatly influence the system, that is, the noise resonance frequency enters a high region (which can be a setting value varied according to the system) where it does not influence the system, the noise resonance frequency is a critical frequency of 4000 Hz or higher where the noise resonance frequency does not greatly influence the system as in FIGS. 4A and 4B.

As mentioned above, the number of teeth of the motor pulley 101 may be relatively prime with respect to the order of the motor noise frequency, and may be a prime number.

According to the embodiment of the present invention, a motor pulley 101 having a number of teeth that can minimize an influence of a resonance phenomenon can be realized by applying the method of selecting the number of teeth of the motor pulley 101, and a motor apparatus including the motor pulley 101 and a steering apparatus including the motor apparatus can be realized.

In summary, according to an aspect of the present invention, there is provided a motor pulley 101 connected to a motor having motor poles 210 and motor slots 220, wherein the number of the teeth of the motor pulley 101 is selected such that a noise resonance frequency generated when a motor noise frequency generated by at least one of the number of the motor poles 210 and the number of the motor slots 220 becomes an integer number of times (ex: 1 times, 2 times, 3 times, . . . ) as high as a motor pulley noise frequency generated when the teeth of the motor pulley 101 are enmeshed with the teeth of the belt enters a frequency region (ex: 4000 Hz or higher) higher than a predefined critical frequency. Here, the number of the teeth of the motor pulley is relatively prime with respect to the order of the motor noise frequency.

According to another aspect of the present invention, there is provided a motor apparatus including a motor pulley 101 including a motor having a predetermined number of motor poles 210 and a predetermined number of motor slots 220, and a motor pulley 101 having a predetermined number of teeth determined to minimize a resonance phenomenon. Here, the number of teeth of the motor pulley 101 may be relatively prime with respect to the number of motor poles, the number of motor slots, and the least common multiple of the number of motor poles and the number of motor slots.

According to still another aspect of the present invention, there is provided a steering system (steering apparatus) including a motor and a motor pulley 101. Here, the number of teeth of the motor pulley 101 may be relatively prime with respect to the number of motor poles, the number of motor slots, and the least common multiple of the number of motor poles and the number of motor slots.

Meanwhile, according to the present invention, the number of teeth of the motor pulley 101 may be selected to be a prime number in order to minimize an influence of resonance without considering the number of motor poles and the number of motor slots.

Accordingly, the present invention can provide a motor pulley 101 connected to a motor and whose number of teeth is a prime number.

By selecting the number of teeth of the motor pulley as in the above-mentioned method, an influence of a resonance phenomenon can be minimized in an apparatus or system including a motor pulley, and hence noise and vibrations generated in the apparatus or system can be reduced, making it possible to prevent the lowering of the durability of the apparatus or system.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardware components. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A motor pulley connected to a motor comprising motor poles and motor slots,
wherein a number of teeth of the motor pulley is selected such that a noise resonance frequency generated when a motor noise frequency generated by at least one of a number of the motor poles and a number of the motor slots becomes an integer number of times as high as a motor pulley noise frequency generated when the teeth of the motor pulley are enmeshed with teeth of a belt enters a frequency region higher than a predefined critical frequency, and
the number of the teeth of the motor pulley is relatively prime with respect to the order of the motor noise frequency.

2. The motor pulley as claimed in claim 1, wherein the order of the motor noise frequency is at least one of the number of the motor poles, the number of the motor slots, and the least common multiple of the number of the motor poles and the number of the motor slots.

3. The motor pulley as claimed in claim 2, wherein the number of the motor poles is 6 or 8 and the number of the motor slots is 9 or 12, wherein when the number of the motor poles is 6 and the number of the motor slots is 9, the number of the teeth of the motor pulley is relatively prime with respect to the orders of the motor noise frequency, i.e. 6, 9 and 8, and wherein when the number of the motor poles is 8 and the number of the motor slots is 12, the number of the teeth of the motor pulley is relatively prime with respect to the orders of the motor noise frequency, i.e. 8, 12 and 14.

4. The motor pulley as claimed in claim 1, wherein the number of the teeth of the motor pulley is one of 31, 37, 41, 43, 47, 53, and 59.

5. The motor pulley as claimed in claim 1, wherein the number of the teeth of the motor pulley is a prime number.

* * * * *